April 6, 1943.  W. H. HIRSCHFELD  2,315,703
MOTION PICTURE PROJECTOR
Filed May 16, 1939  2 Sheets-Sheet 1
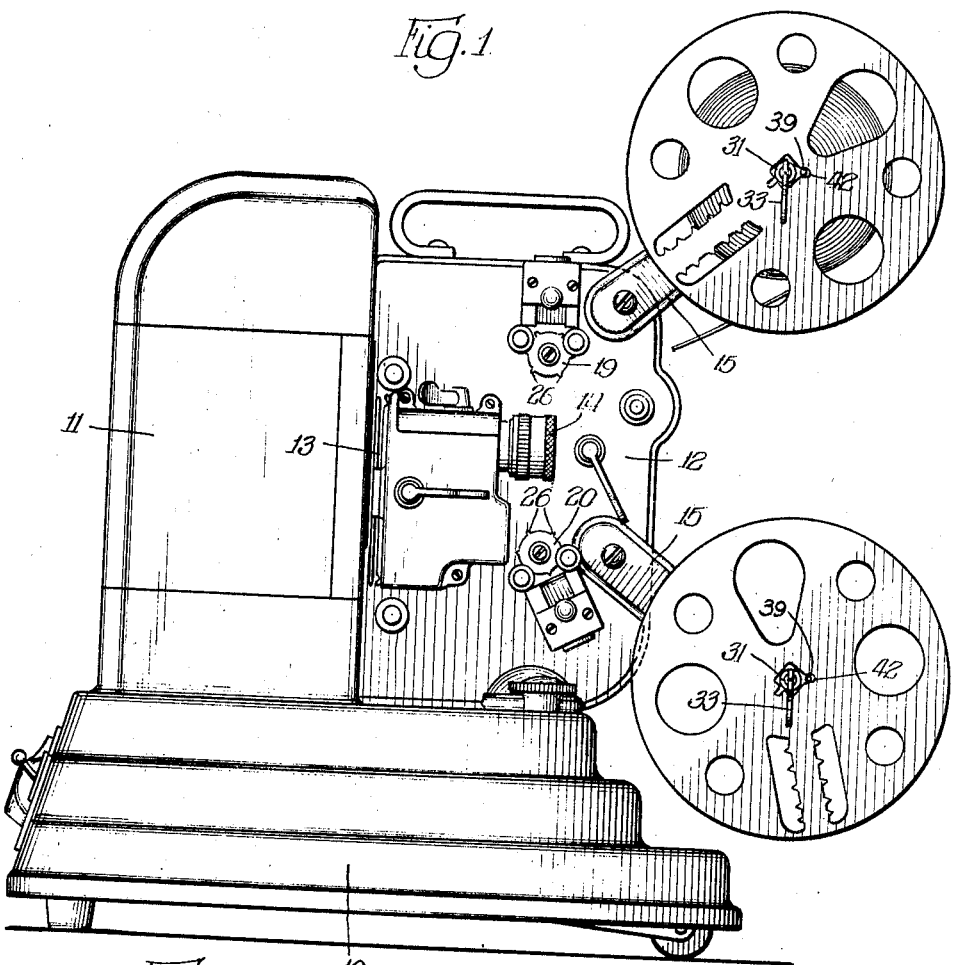
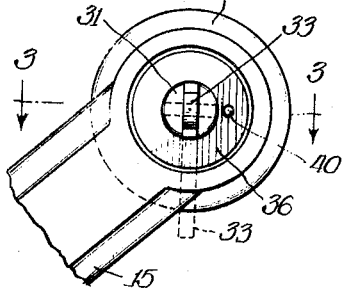
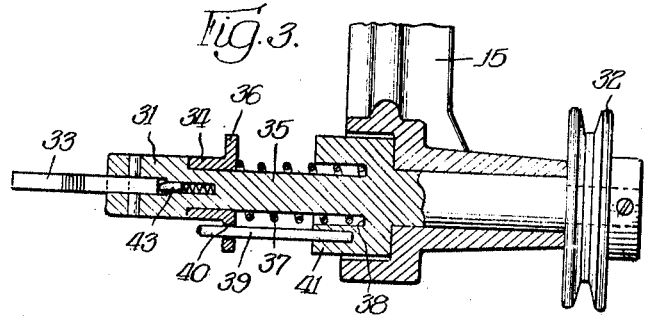
INVENTOR.
Walter H Hirschfeld,
BY
ATTORNEYS April 6, 1943.    W. H. HIRSCHFELD    2,315,703
MOTION PICTURE PROJECTOR
Filed May 16, 1939    2 Sheets-Sheet 2
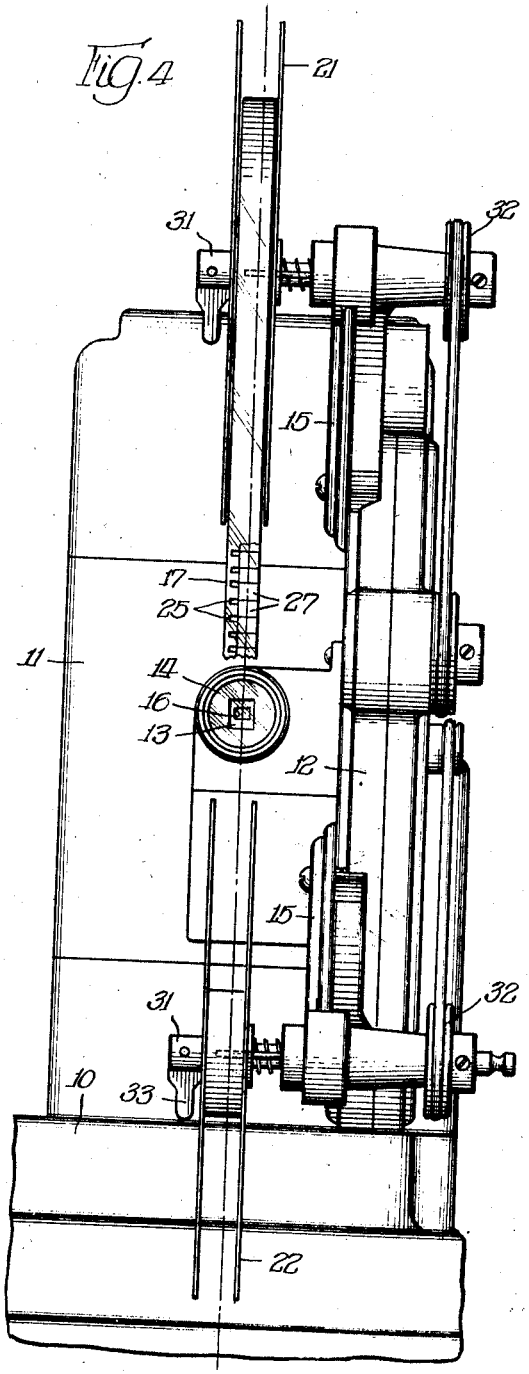
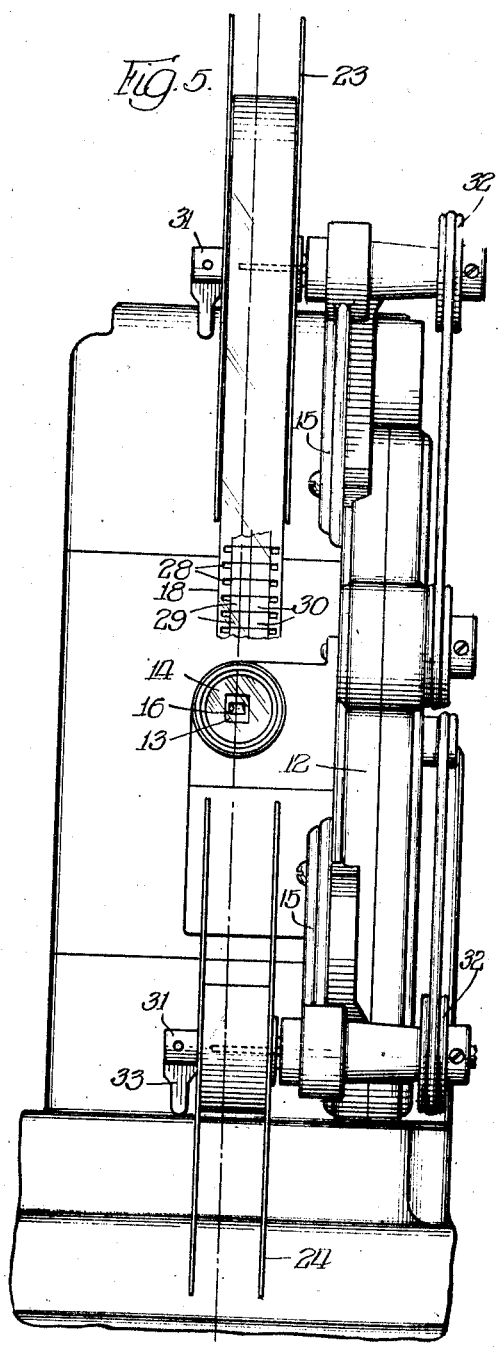
INVENTOR.
Walter H. Hirschfeld,
BY Cromwell, Greist & Warden
ATTORNEYS.

Patented Apr. 6, 1943

2,315,703

UNITED STATES PATENT OFFICE 2,315,703

MOTION PICTURE PROJECTOR

Walter H. Hirschfeld, Chicago, Ill., assignor to Max Levey, Chicago, Ill.

Application May 16, 1939, Serial No. 273,975

4 Claims. (Cl. 88—16)

This invention has to do with motion picture projectors of the type used in projecting 8 mm. films.

The principal object of the invention is to provide an improved projector of the type described which will project either single-width 8 mm. films or double-width 8 mm. films.

With this improved projector, either width film may be projected with equal facility, without any changes or mechanical alterations or adjustments of the projector. When double-width film is projected no rewinding of the film is necessary.

While the foregoing statements are indicative in a general way of the nature of the invention, other more specific objects and advantages will be apparent to those skilled in the art upon a full understanding of the construction, arrangement and operation of the improved projector.

A preferred embodiment of the invention is presented herein for the purpose of exemplification, but it will of course be appreciated that the invention is susceptible of embodiment in other structurally modified forms coming equally within the scope of the appended claims.

In the accompanying drawings:

Fig. 1 is a side view of a projector constructed in accordance with the invention;

Fig. 2 is a fragmentary side view of the outer end of one of the reel-supporting arms;

Fig. 3 is a longitudinal section through the spindle carried by such arm; taken on the line 3—3 of Fig. 2;

Fig. 4 is a front view of the projector, showing the same in readiness for the projection of a single-width 8 mm. film; and Fig. 5 is a similar view of the projector, showing the same in readiness for the projection of a double-width 8 mm. film.

The projector shown in the drawings includes primarily a base 10, a lamp house 11, a mechanism frame 12, an aperture plate 13, a lens 14, and two reel-supporting arms 15.

The aperture plate 13 contains a rectangular aperture 16 of the proper size to frame a picture on an 8 mm. film, which aperture is centered with respect to the axis of the lens 14. The film to be projected—whether a single-width 8 mm. film such as the film 17 shown in Fig. 4, or a double-width 8 mm. film such as the film 18 shown in Fig. 5—is fed from a pay-out reel carried by the upper arm 15, about a guide roller 19, past the aperture plate 13, about another guide roller 20, onto a take-up reel carried by the lower arm 15. If the film is of single width narrow pay-out and take-up reels 21 and 22 are used while if the film is of double width wide pay-out and take-up reels 23 and 24 are used.

The single-width film 17 is threaded through the projector in the usual way, with the perforations 25 along the outer edge of the film in engagement with the feeding teeth 26 provided on the guide rollers 19 and 20 and other parts of the feeding mechanism, which teeth serve to position the film with the sequence of pictures 27 thereon in register with the framing aperture 16, as shown in Fig. 4. The double-width film 18 is threaded through the projector in the same way, with the perforations 28 along the outer edge of the film in engagement with the same teeth, which teeth serve to position the film with the outer sequence of pictures 29 thereon in register with the framing aperture 16, leaving the inner sequence of pictures 30 offset laterally with respect to such aperture, as shown in Fig. 5.

The reels for the film are mounted on spindles 31 carried by the arms 15. The spindles 31 are rotatably mounted in the arms 15 and are driven by flexible bands which pass about pulleys 32 secured to the inner ends of the spindles. These spindles are designed to take either the narrow reels 21 and 22 for the single-width film 17 or the wide reels 23 and 24 for the double-width film 18, with equal facility, and without any changes or mechanical alterations or adjustments, and are designed to automatically position either the single sequence of pictures 27 on a narrow width film or the outer sequence of pictures 29 on a double-width film in register with the framing aperture 16.

Each of the spindles 31 is provided at its outer end with a pivotally mounted finger 33. The finger 33, when swung downwardly, forms a fixedly positioned but readily removable stop for engagement with the outer side of any reel placed on the spindle, regardless of whether it be one of the narrow reels 21 and 22 or one of the wide reels 23 and 24. The location of the reel-abutting surface of the finger is such that if a single-width film 17 is being used the sequence of pictures 27 on the same will be centered exactly with the framing aperture 16 and if a double-width film 18 is being used the outer sequence of pictures 29 will be centered in the same way.

When a reel is placed on the spindle 31 and the finger 33 turned to provide a stop for the outer side of the reel the reel will be automatically positioned against this stop by a collar 34 which is slidably mounted on a reduced portion 35 of the spindle. This collar is provided with an annular flange 36 which is adapted to bear against the inner side of the reel. The collar 34 is pressed resiliently in the direction of the reel by a coil spring 37 which encircles the reduced portion 35 of the spindle and is compressed between the flange 36 and an abutment 38 on the spindle. When one of the narrow reels is placed on the spindle the collar 34 will move outwardly substantially as far as it can go, to about the position shown in Fig. 3, while when one of the wide reels is used the collar (which is forced back by the reel during the application of the latter to the spindle) will move outwardly but a short distance. The collar 34 is prevented from turning on the reduced portion 35 of the spindle by a pin 39 which passes through a small hole 40 in the flange 36. This pin, which is anchored in another rearwardly disposed portion 41 of the spindle, extends toward the outer end of the spindle in parallel relation to the axis of the latter and serves as a driving means for the reel, the latter, regardless of its width, being provided at its center with a notch 42 for circumferential interlocking engagement with the pin. The finger 33 on the spindle is held in either its downwardly turned locking position or its outwardly turned releasing position by a small spring-pressed indexing plunger 43 in the spindle, which plunger bears against the finger and yieldingly resists movement of the latter from one position to the other.

From the foregoing it will be appreciated that with the projector of this invention either single-width films or double-width films may be projected with equal facility. In the finishing of 8 mm. pictures—which are usually exposed first along one side of a 16 mm. film and then in the opposite direction along the other side of that film—it is only necessary to instruct the finisher not to follow the usual practice of splitting the film after processing. By leaving the film intact, with two sequences of pictures on the same wide film running in opposite directions, the film may be projected in this improved projector as double-width film and each side of the film can be projected in turn without the necessity of rewinding. All that is necessary, after one sequence of pictures along one side of the film has been projected, is to remove the reels from the spindles, turn them over, interchange them top and bottom, and replace them on the spindles. By doing this, the sequence of pictures which was on the inside before the reversal was made will assume a position on the outside in register with the framing aperture, in readiness to be run.

I claim:

1. A motion picture projector for use with either single-width or double-width films containing the same size pictures, characterized by a single-width framing aperture, which framing aperture is stationary and is arranged for registration and use with either the single row of pictures on a single-width film or with one of the two parallel rows of pictures on a double-width film, means for feeding a film past the aperture from a pay-out reel to a take-up reel, spindles fixedly positioned with respect to the aperture for supporting the reels, and means associated with the spindles for automatically positioning corresponding sides of the reels in the same plane with respect to the stationary single-width framing aperture regardless of whether the reels are narrow and carry only a single-width film having but one row of pictures or are wide and carry a double-width film having two parallel rows of pictures.

2. A motion picture projector for use with either single-width or double-width films containing the same size pictures, characterized by a single-width framing aperture, which framing aperture is stationary and is arranged for registration and use with either the single row of pictures on a single-width film or with one of the two parallel rows of pictures on a double-width film, means for feeding a film past the aperture from a pay-out reel to a take-up reel, spindles fixedly positioned with respect to the aperture for supporting the reels, and means associated with the spindles for automatically positioning the outer sides of the reels in the same plane with respect to the stationary single-width framing aperture regardless of whether the reels are narrow and carrying only a single-width film having but one row of pictures or are wide and carry a double-width film having two parallel rows of pictures.

3. A motion picture projector for use with either single-width or double-width films containing the same size pictures, characterized by a framing aperture, means for feeding a film past the aperture from a pay-out reel to a take-up reel, spindles fixedly positioned with respect to the aperture for supporting the reels, and means associated with the spindles for automatically positioning the outer sides of the reels in the same plane with respect to the framing aperture regardless of whether the reels are narrow and carry only a single-width film or are wide and carry a double-width film, said positioning means consisting of removable stops for limiting movement of the reels outwardly along the spindles, and spring-pressed followers for yieldingly holding the reels against the stops.

4. In a motion picture projector for use with either single-width films or double-width films having two series of adjacent single-width film pictures side by side on the outer and inner sides thereof, spaced spindles for supporting a pay-out reel and a corresponding take-up reel for either width films in alignment with each other, a single-width framing aperture in alignment with one portion of said spindles and past which said films must travel, said spindles fixedly positioned with respect to said aperture, and means associated with said spindles and with said reels upon placing one or the other width of film reels separately on said spindles for automatically positioning the single-width film or one series on one side of a double-width film on those portions of the spindles in alignment with said aperture.

WALTER H. HIRSCHFELD.